Patented June 18, 1935

2,005,506

UNITED STATES PATENT OFFICE 2,005,506

PROCESS OF PRODUCING 4 - DIMETHYL-AMINO-1-PHENYL-2,3-DIMETHYL - 5 - PYRAZOLONE

Baptist Reuter, Krailling-Planegg, Germany

No Drawing. Application November 28, 1932, Serial No. 644,748. In Germany March 10, 1927

20 Claims. (Cl. 260—45)

In German Patent No. 431,164 a process of producing 4-dimethylamino-1-phenyl-2,3-dimethyl-5-pyrazolone is described, the essential feature of which is, that the separation of the 4-amino-1-phenyl-2,3-dimethyl-5-pyrazolone is avoided.

I have now found, that the producing of the dimethylamino compound may be still more simplified by starting with 1-phenyl-3-methyl-5-pyrazolone and avoiding the separation of 1-phenyl-2,3-dimethyl-5-pyrazolone in the form of a base as well as the purification of the same. This is of course an essential improvement over the known process according to which isolated and purified 1-phenyl-2,3-dimethyl-5-pyrazolone is used as starting material.

According to the present invention methylation melts, obtained in usual manner from 1-phenyl-3-methyl-5-pyrazolone, are heated to about 100° C. for a longer time together with alkali hydroxide or alkali carbonate solutions and the melts treated in this manner are acidulated and subjected to a further treatment in order to obtain nitroso antipyrine. This further treatment may be performed immediately after the mass has been acidulated or after the separation of the solid compound.

During the methylations intermediate products are formed in the melts, but when proceeding after the usual method it is not possible to separate out these intermediate products in the form of solid products or in the form of 4-nitrosol-1-phenyl-2,3-dimethyl-5-pyrazolone.

However, by means of the alkali treatment mentioned above these intermediate products are converted into salts of the 1-phenyl-2,3-dimethyl-5-pyrazolone and the yield of nitroso compound is increased about 12-15%.

If the methylation melt of p-toluene-sulfonic acid methyl ester and 1-phenyl-3-methyl-5-pyrazolone (see for instance the article published by Rodionow in Bulletin de la Société Chimique, vol. (4), 29, page 321) is treated with alkali in the manner indicated above and mineral acids are added until the product shows a distinctly acid reaction with Congo red, the yield of salt is increased, and when cooling and stirring the p-toluene-sulfonic acid salt of the 1-pheyl-2,3-dimethyl-5-pyrazolone will separate out. The product is treated in a suction filter, washed with water to which some acid has been added and dried or subjected to the further treatment in the moist state in which it is taken from the suction filter.

Through the separation of this salt the higher methylated products produced by the methylation will be retained in the mother liquor, wherefore an exceedingly pure nitroso product is obtained.

The aqueous solution of this p-toluene-sulfonic-acid salt will without further addition of acid react directly with nitrites, whereby 4-nitroso-1-phenyl-2,3- dimethyl - 5 - pyrazolone is formed. The separated very pure nitroso product is immediately after the drying converted into 4-dimethylamino-1-phenyl-2,3- dimethyl - 5 - pyrazolone without it being necessary to separate out the 4-amino-1-phenyl-2,3-dimethyl-5-pyrazolone in the form of a base. For this purpose the nitroso compound is under stirring brought into a mass consisting of ice, zinc dust and bisulphite. Under gradual or spontaneous heating of the initially very cold mirture a reduction takes place within short time without any development of hydrogen. The slime formed is at first of thin consistancy, solidifies thereupon for some time to a thick paste and finally again turns fluid. If this solution is heated to about 70-90° C. and filtered, almost the entire amount of zinc used is precipitated in the form of an easily filterable mass and a clear solution is obtained, which when heated with formaldehyde and formic acid will give a good yield of 4-dimethylamino-1-phenyl-2,3-dimethyl-5-pyrazolone. After methylation and neutralization with mono- or bicarbonates or non-volatile alkalies this salt is obtained in crystalline form. The rest may be extracted from the mother liquor by means of benzene.

It is also possible to super-alkalize by means of non-volatile alkali and shake the product with benzene without any zinc slime emulsions being formed. The formation of such emulsions forms a great drawback at older processes of similar kind, such as for instance the process disclosed in the Swiss Patent No. 110,202. According to this patent a strongly acid solution and large amount of zinc are used, since also the methylation is performed by reducing formaldehyde by means of hydrogen developed through reaction between the acids and the zinc. When the end product is deposited, the total amount of zinc used is still in solution and it is necessary to decompose the zinc compounds by heating for a long time with alkali in surplus. When shaking the substance together with benzene disagreeable emulsions are formed, which must be filtered off from the benzene solution. These operations require special devices of different kinds and incur waste of time as well as losses in solvents. It is not possible in accordance with the said Swiss patent to separate out the pyramidone directly after the reduction in crystalline form, since the first substances to precipitate would be the zinc oxide and the zinc double-salt of the 4-dimethylamino product. It is thus evident that the present method represents a vast improvement over the method disclosed in Swiss Patent No. 110,202.

According to a modification of the present invention the alkylation melt, which in the manner described above has been treated with alkali, is treated with acids until a neutral reaction is obtained with Curcuma, without the p-toluene-sulfonic-acid salt being precipitated. Thereupon 1 molecule of NaNO$_2$, dissolved in water, is added and the mass is treated for about 2 hours with hydrochloric acid, so that the nitrite will influence the mass in two stages.

The HNO$_2$ which is set free will at first influence the by-products in the melt and convert the same into resinous masses before the 1-phenyl-2,3-dimethyl-5-pyrazolone is converted into the nitroso compound. When all by-products are separated out, the color of the solution will change from brown to green.

As soon as this color change is observed, the supply of acid is interrupted. The resinous masses are filtered off and additional hydrochloric acid is added under stirring and cooling, whereby 4-nitroso-1-phenyl-2,3-dimethyl-5-pyrazolone is obtained in the form of green crystals. If necessary additional small amounts of nitrite or acid are added. As soon as the nitroso product has been obtained the mass is stirred for about half an hour, treated in a suction filter and washed with water and subsequently with alcohol.

It is also possible to treat other methylation melts of the 1-phenyl-3-methyl-5-pyrazolone, which have been boiled together with alkali, in the same manner, for instance melts which have been produced by means of dimethyl sulphate or methyl bromide or other methylating agents. Also the last mentioned nitroso products are reduced and methylated in the manner described above.

When proceeding in the manner described above 174 g. of the pyrazolone will yield up to 190 g. 4-dimethylamino-1-phenyl-2,3-dimethyl-5-pyrazolone (about 82% of the theoretically calculated amount). When isolating the 1-phenyl-2,3-dimethyl-5-pyrazolone, the yield will only amount to 54% of the theoretically calculated amount.

EXAMPLES

EXAMPLE 1

*Producing of the p-toluol-sulfonic-acid salt*

174 g. of 1-phenyl-3-methyl-5-pyrazolone and 195 g. of p-toluene-sulfonic-acid methyl ester are heated under stirring for about 5-6 hours and 150 ccm. of water and 87 g. of NaOH (46%) are added whereby the melt passes into solution. After addition of further 44 g. of NaOH the mass is heated to 100° C. under stirring for about 2 hours. Thereupon the mass is cooled and under stirring and cooling 190 g. of hydrochloric acid (30%) are added. The solution must show a distinct acid reaction with Congo red. The product is stirred for some hours, whereupon the obtained salt is separated from the fluid in a suction filter and washed with water to which some hydrochloric acid has been added. The product is dried in vacuum.

EXAMPLE 2

*Nitroso compound*

253 g. of p-toluene-sulfonic-acid 1-phenyl-2,3-dimethyl-5-pyrazolone are mixed with 670 g. of ice water and under stirring a concentrated solution of sodium nitrite is added, whereby the salt is dissolved. A thick paste of 4-nitroso-1-phenyl-2,3-dimethyl-5-pyrazolone will separate out after a short time. A small amount of hydrochloric or sulphuric acid is added until an acid reaction is obtained with Congo red and, if necessary, so much nitrite is added that iodine starch-paper is colored blue. In this way a very pure nitroso product is obtained, which directly in the form of slime or after previous isolation may be used in moist or dry state as reducing agent in the manner now to be described.

EXAMPLE 3

*Reduction*

230 g. of zinc dust are thoroughly mixed with 1200 g. of ice, and 1000 g. of a concentrated technical bisulphite solution (about 38%) are added. The mass is thoroughly stirred and 217 g. of the 4-nitroso compound are added at once, whereupon the entire mixture is vigorously stirred. The nitroso compound may be in dry state or in the form of a paste. The initially thick paste formed turns gradually fluid. The mass is stirred for several hours, heated to about 70–90° C. and the liquid is sucked off from the zinc slime formed and washed with water having a temperature of about 80° C.

The obtained solution is of water-like clearness and may be directly methylated in accordance with the method described below.

EXAMPLE 4

*Methylation*

The solution obtained from 1 molecule of nitroso compound is heated to about 90° C. and a mixture of 4 molecules of formaldehyde (36%) and 4 molecules of formic acid (85%) are added. When the said mixture has been filled into the stirring vessel the heating is continuated as long as CO$_2$ is developed.

*a. Direct separation in crystalline form*

About the half of the liquid is distilled off and cooled to about 20° C., whereupon under stirring soda solution of caustic soda, sodium carbonate or sodium bicarbonate is added until an alkaline reaction is distinctly observed. The pyramidone, which is precipitated in crystalline form, is treated in a suction filter, dried and dissolved in hot benzene, whereupon the filtered benzene solution is evaporated in vacuum. Several alkaline mother liquors are combined and extracted with benzene and the benzene residue is again added to the main quantity. In this way only very small amounts of solvents are needed.

*b. Alkaline shaking treatment of the methylation liquid*

To the concentrated and filtered methylation solution of 1 molecule of pyrazolone, 800 ccm. of NaOH (40° Bé.) are added and the mixture is shaken together with 800 ccm. benzene. The caustic solution is removed and the filtered benzene solution is evaporated. The last stage of evaporation takes place under vacuum.

Example 5

Direct treatment of the methylated melt with NaNO₂

The alkalized methylation melt obtained in accordance with Example 1 is treated with hydrochloric acid (18%) until a neutral reaction is obtained with Curcuma, whereupon 600 g. of ice per molecule are added. A solution of 90 g. of sodium nitrite in 100 ccm. of water is also added. Thereupon 1 molecule of hydrochloric acid (18%) is added under stirring. Initially a small amount of brown resin will separate out. As soon as the color of the solution changes to green, the supply of acid is stopped and the resin is sifted off, whereupon acid again is added until a nitro compound is separated out. The product is treated in a suction filter and washed with water and thereupon with denatured spirit or other solvents in order to remove residual contaminations. The solution must also in this case show acid reaction with Congo red and must give iodine starch-paper a blue color. A very good yield is obtained and the compound may be used for reduction in moist state. The reducing and the methylation are performed exactly in the manner described in Example 3 and 4.

Example 6

174 g. of 1-phenyl-3-methyl-5-pyrazolone and 120 g. of dimethyl sulphate are mixed together and heated cautiously. When this charge for about 6 hours has been subjected to a temperature of about 160° C., 50 ccm. of water and 196 g. of a solution of caustic soda (40° Bé.) are added and the mass is again heated for about 2 hours at about 100° C. whereupon hydrochloric acid is added until neutral reaction is obtained with Curcuma. Now 1 molecule of NaNO₂ is added and the treatment is continued as described above, whereby the nitrite is allowed to act in two stages.

I claim:

1. A process for producing 4-dimethylamino-1-phenyl-2,3-dimethyl-5-pyrazolone which comprises the steps of heating the melt, resulting from the methylation of 1-phenyl-3-methyl-5-pyrazolone, with a compound of the group consisting of an alkali-metal hydroxide, an alkali-metal carbonate, and an alkali-metal bicarbonate at substantially 100° C. for a relatively long period of time, acidulating the resulting mass with a dilute solution of a mineral acid, treating said acidulated mass with an alkali-metal nitrite, thereby producing 4-nitroso-1-phenyl-2,3-dimethyl-5-pyrazolone, washing said 4-nitroso compound with alcohol, adding to said washed compound sodium bisulphite, ice and zinc dust, thereby causing a reaction to take place which first proceeds at a relatively low temperature, which temperature, as the reaction continues, is raised automatically as a result of the heat developed by said reaction until a temperature of 30° C. is obtained, thereby resulting in a mixture comprising zinc sulphite-containing slurry, heating said mixture, filtering to remove said slurry, and heating the filtered solution with formaldehyde and formic acid in order to convert it into the desired product.

2. A process for producing 4-dimethylamino-1-phenyl-2,3-dimethhyl-5-pyrazolone which comprises the steps of heating a melt, resulting from methylation of 1-phenyl-3-methyl-5-pyrazolone, with a compound of the group consisting of an alkali-metal hydroxide, an alkali-metal carbonate, and an alkali-metal bicarbonate at substantially 100° C. for a relatively long period of time, acidulating the resulting mass with a dilute solution of a mineral acid, thereby producing the p-toluene-sulphonic acid salt of 1-phenyl-2,3-dimethyl-5-pyrazolone which is separated from the solution, adding an alkali-metal nitrate to said sulphonic acid salt, thereby forming 4-nitroso-1-phenyl-2,3-dimethyl-5-pyrazolone, washing said 4-nitroso compound with alcohol, adding thereto sodium bisulphite, ice and zinc dust, whereupon a chemical reaction occurs, said chemical reaction proceeding at a relatively low temperature at first, the temperature increasing as a result of the heat developed by the reaction until a temperature of substantially 30° C. is obtained, thereby producing a slurry containing zinc sulphite, filtering to separate the solution of 4-amino-1-phenyl-2,3-dimethyl-5-pyrazolone, which is formed, from said slurry, and then heating the filtrate with formaldehyde and formic acid, thereby producing the desired product.

3. A process for producing 4-dimethylamino-1-phenyl-2,3-dimethyl-5-pyrazolone which comprises the steps of heating the melt, obtained as a result of the methylation of 1-phenyl-3-methyl-5-pyrazolone, with a compound of the group consisting of an alkali-metal hydroxide, an alkali-metal carbonate, and an alkali-metal bicarbonate at substantially 100° C. for a relatively long period of time, acidulating the resulting mass with a dilute solution of a mineral acid, adding to said acidulated mass an alkali-metal nitrite and an acid, said alkali-metal nitrite and acid being added to said mass in two portions, the resinous by-products formed being removed from the mixture after the first addition of said alkali nitrite and acid, 4-nitroso-1-phenyl-2,3-dimethyl-5-pyrazolone being formed after the second addition of said nitrite, adding to said 4-nitroso compound sodium bisulphite, ice and zinc dust, whereupon a reaction commences, said reaction proceeding at first at a relatively low temperature, the temperature automatically increasing as a result of the heat developed by the reaction until it attains a value of 30° C., thereby producing a slurry containing zinc sulphite, 4-amino-1-phenyl-2,3-dimethyl-5-pyrazolone remaining in the solution, removing said slurry by filtration, adding to the filtrate formaldehyde and formic acid and heating in order to produce the desired product.

4. A process for producing 4-dimethylamino-1-phenyl-2,3-dimethyl-5-pyrazolone which comprises the steps of heating a melt, resulting from the methylation of 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of mineral acid, adding to said acidulated mass an alkali-metal nitrite and a dilute mineral acid, resinous by-products being precipitated, removing said resinous by-products, adding to said resulting clear solution an additional quantity of an alkali-metal nitrite and a dilute mineral acid, thereby producing 4-nitroso-1-phenyl-2,3-dimethyl - 5 - pyrazolone, washing said 4-nitroso compound with alcohol, adding to said washed compound sodium bisulphite, ice and zinc dust whereupon a chemical reaction occurs, said reaction proceeding at first at a relatively low temperature, which temperature is raised automatically by the heat of the reaction until a temperature of 30° C. results, thereby producing a slurry of zinc sulphite, the clear solution containing 4-amino-1-phenyl-2,3-dimethyl-5-pyrazolone, filtering to remove said slurry, and heating said filtrate with formaldehyde and formic acid, thereby producing the desired product.

5. A process for producing 4-dimethylamino-1-phenyl-2,3-dimethyl-5-pyrazolone which comprises the steps of heating a melt, obtained by the action of p-toluene-sulphonic-acid-methyl-ester on 1-phenyl-3-methyl-5-pyrazolone, with a compound of the group consisting of an alkali-metal hydroxide, an alkali-metal carbonate, and an alkali-metal bicarbonate at substantially 100° C. for a relatively long period of time, acidulating the resulting mass with a dilute solution of a mineral acid, thus producing the p-toluene-sulphonic-acid salt of 1-phenyl-2,3-dimethyl-5-pyrazolone, adding thereto a dilute mineral acid and an alkali-metal nitrite, thereby producing 4-nitroso-1-phenyl-2,3-dimethyl-5-pyrazolone, washing said 4-nitroso compound with alcohol, adding to said washed compound sodium bisulphite, ice and zinc dust, whereupon a chemical reaction occurs, which reaction proceeds at first at a relatively low temperature, which temperature is automatically raised by the heat developed by the reaction until a temperature of substantially 30° C. is obtained, thereby producing a slurry of zinc sulphite, the clear solution containing 4-amino-1-phenyl-2,3-dimethyl-5-pyrazolone, filtering to remove said slurry and heating the filtrate with formaldehyde and formic acid, thereby producing the desired product.

6. A process for producing 4-dimethylamino-1-phenyl-2,3-dimethyl-5-pyrazolone which comprises the steps of heating the melt, obtained by the action of p-toluene-sulphonic-acid-methyl-ester on 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, adding to said mass an amount of an alkali nitrite and a dilute mineral acid, thereby precipitating resinous by-products, removing said resinous by-products, adding to said mixture a second portion of said alkali-metal nitrite and said acid, thereupon forming 4-nitroso-1-phenyl-2,3-dimethyl-5-pyrazolone, adding to said 4-nitroso compounds sodium bisulphite, ice and zinc dust, whereupon a chemical reaction occurs, which reaction proceeds at a relatively low temperature at first, which temperature is automatically raised by the heat of the reaction until it attains a value of substantially 30° C., whereupon a slurry of zinc sulphite is produced, the clear solution containing 4-amino-1-phenyl-2,3-dimethyl-5-pyrazolone, filtering to remove said slurry, and heating said filtrate with formaldehyde and formic acid in order to form the desired product.

7. A process for producing 4-dimethylamino-1-phenyl-2,3-dimethyl-5-pyrazolone which comprises the steps of heating a melt, obtained by the action of p-toluene-sulphonic-acid-methyl-ester upon 1-phenyl-3-methyl-5-pyrazolone, with a compound of the group consisting of an alkali-metal hydroxide, an alkali-metal carbonate, and an alkali-metal bicarbonate at substantially 100° C. for a relatively long period of time, acidulating the resulting mass with a dilute solution of a mineral acid, adding to said acidulated mass an amount of an alkali-metal nitrite and a dilute mineral acid, thereupon precipitating resinous by-products, removing said resinous by-products, adding to the clear solution resulting an additional amount of said alkali-metal nitrite and said acid whereupon 4-nitroso-1-phenyl-2,3-dimethyl-5-pyrazolone forms, washing said 4-nitroso compound with alcohol, adding thereto sodium bisulphite, ice, and zinc dust, whereupon a chemical reaction occurs, which chemical reaction proceeds at a relatively low temperature at first, which temperature is automatically raised by the heat of the reaction until it attains a value of substantially 30° C., thereby producing a slurry of zinc sulphite and a clear solution of 4-amino-1-phenyl-2,3-dimethyl-5-pyrazolone, filtering to remove said slurry, and then heating said filtrate with formaldehyde and formic acid in order to form the desired product.

8. A process for producing 4-dimethylamino-1-phenyl-2,3-dimethyl-5-pyrazolone which comprises the steps of heating a melt, resulting from the action of dimethyl sulphate on 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, adding to said mass an alkali-metal nitrite, thereupon producing 4-nitroso-1-phenyl-2,3-dimethyl-5-pyrazolone, washing said 4-nitroso compound with alcohol, adding to said washed compound sodium bisulphite, ice and zinc dust, whereupon a chemical reaction occurs, which reaction at first proceeds at a relatively low temperature, which temperature is raised automatically by the heat of the reaction until it attains a value of substantially 30° C., thereby producing a slurry of zinc sulphite, the solution containing 4-amino-1-phenyl-2,3-dimethyl-5-pyrazolone, filtering to remove said slurry, and heating said filtrate with formaldehyde and formic acid, thereby producing the desired product.

9. A process for producing 4-dimethylamino-1-phenyl-2,3-dimethyl-5-pyrazolone which comprises the steps of heating a melt, resulting from the action of dimethyl sulphate on 1-phenyl-3-methyl-5-pyrazolone, with a compound of the group consisting of an alkali-metal hydroxide, an alkali-metal carbonate, and an alkali-metal bicarbonate at substantially 100° C. for a relatively long period of time, acidulating the resulting mass with a dilute solution of a mineral acid, adding to said mass a portion of an alkali-metal nitrite and a dilute mineral acid, thereupon precipitating resinous by-products, removing said resinous by-products, adding to said solution a second portion of said alkali-metal nitrite and said acid, thereupon forming 4-nitroso-1-phenyl-2,3-dimethyl-5-pyrazolone, adding to said nitroso compound sodium bisulphite, ice and zinc dust, whereupon a chemical reaction occurs, which reaction proceeds at a relatively low temperature, which temperature is automatically raised until it attains a value of substantially 30° C. as a result of the heat of the reaction, thereby producing a slurry containing zinc sulphite and a solution containing 4-amino-1-phenyl-2,3-dimethyl-5-pyrazolone, filtering to remove said slurry and heating the filtrate with formaldehyde and formic acid, thereupon producing the desired product.

10. A process for producing 4-dimethylamino-1-phenyl-2,3-dimethyl-5-pyrazolone which comprises the steps of heating a melt, obtained by the action of dimethyl sulphate on 1-phenyl-3- methyl-5-pyrazolone, with a compound of the group consisting of an alkali-metal hydroxide, an alkali-metal carbonate, and an alkali-metal bicarbonate for a relatively long period of time at substantially 100° C., acidulating the resulting mass with a dilute solution of a mineral acid, adding to said acidulated mass a portion of an alkali-metal nitrite and a dilute mineral acid, thereupon precipitating resinous by-products, removing said resinous by-products, adding to resulting clear solution a second portion of said alkali-metal nitrite and said acid, thereupon producing 4-nitroso-1-phenyl-2,3-dimethyl-5-pyrazolone, washing said 4 nitroso compound with alcohol, adding to said washed compound sodium bisulphite, ice and zinc dust, whereupon a chemical reaction occurs, which reaction proceeds at a relatively low temperature at first, which temperature is automatically elevated as a result of the heat of the reaction until a value of substantially 30° C. is obtained, thereby forming a slurry containing zinc sulphite and a solution of 4-amino-1-phenyl-2,3-dimethyl-5-pyrazolone, filtering to separate said slurry, and heating the resulting filtrate with formaldehyde and formic acid, whereupon the desired product is produced.

11. A process for producing 4-dimethylamino-1-phenyl-2,3-dimethyl-5-pyrazolone which comprises the steps of heating a melt, resulting from the action of methyl bromide on 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, adding to said mass an alkali-metal nitrite, thereupon forming 4-nitroso-1-phenyl-2,3-dimethyl-5-pyrazolone, washing said 4-nitroso compound with alcohol, mixing said washed compound with sodium bisulphite, ice and zinc dust, whereupon a chemical reaction occurs, which reaction at first proceeds at a relatively low temperature, which temperature is automatically raised by the heat of reaction until it attains a value of substantially 30° C., thereby forming a slurry containing zinc sulphite and a solution containing 4-amino-1-phenyl-2,3-dimethyl-5-pyrazolone, filtering to remove said slurry, heating said filtrate with formaldehyde and formic acid in order to form the desired product.

12. A process for producing 4-dimethylamino-1-phenyl-2,3-dimethyl-5-pyrazolone which comprises the steps of heating a melt, obtained by the action of methyl bromide on 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, adding to said mass a portion of an alkali-metal nitrite and a dilute mineral acid, thereupon precipitating resinous by-products, removing said resinous by-products, adding to the resulting solution a second portion of said alkali-metal nitrite and said acid, thereby forming 4-nitroso-1-phenyl-3-methyl-5-pyrazolone, adding to said 4-nitroso compound sodium bisulphite, ice and zinc dust, whereupon a chemical reaction occurs, which reaction proceeds at a relatively low temperature at first, which temperature is automatically raised until a temperature of 30° C. is obtained as a result of the heat developed by said reaction, thereby producing a slurry containing zinc sulphite and a solution of 4-amino-1-phenyl-2,3-dimethyl-5-pyrazolone, filtering to remove said zinc sulphite and heating said filtrate with formaldehyde and formic acid, thereby producing the desired product.

13. A process for producing 4-dimethylamino-1-phenyl-2,3-dimethyl-5-pyrazolone which comprises the steps of heating a melt, obtained by the action of methyl bromide on 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, adding to said acidulated mass an alkali-metal nitrite and a dilute mineral acid, thereupon precipitating resinous by-products, removing said precipitated resinous by-products, whereupon a clear solution is obtained, adding to said clear solution a second portion of said alkali-metal nitrite and said acid, thereupon forming 4 - nitroso - 1 -phenyl-2,3-dimethyl-5-pyrazolone, washing said 4-nitroso compound with alcohol, adding to said washed compound sodium bisulphite, ice and zinc dust, whereupon a chemical reaction occurs which first proceeds at a relatively low temperature, which temperature is automatically raised by the heat of the reaction until a temperature of substantially 30° C. is obtained, thereby producing a slurry containing zinc sulphite and a clear solution containing 4-amino-1-phenyl-2,3-dimethyl-5-pyrazolone, removing said slurry, and heating said clear solution with formaldehyde and formic acid, thereupon producing the desired product.

14. A process for producing 4-dimethylamino-1-phenyl-2,3-dimethyl-5-pyrazolone which comprises the steps of heating a melt, resulting from the methylation of 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, crystallizing out from said acidulated mass the p-toluene sulphonic acid salt of 1-phenyl-2,3-dimethyl-5-pyrazolone, filtering to remove said salt, washing said salt, treating said salt with an alkali-metal nitrite, thereby producing 4-nitroso-1 - phenyl-2,3-dimethyl - 5 - pyrazolone, washing said 4-nitroso compound with alcohol, adding to said washed compound sodium bisulphite, ice and zinc dust, whereupon a chemical reaction occurs, which reaction proceeds at first at a relatively low temperature, which temperature is automatically raised by the heat of the reaction until a temperature of substantially 30° C. is obtained, whereby a slurry containing zinc sulphite and a solution containing 4-amino-1-phenyl-2,3-dimethyl-5-pyrazolone are produced, filtering to remove said slurry, heating the resulting filtrate with formaldehyde and formic acid, thereupon forming the desired product, and isolating said product.

15. A process for producing 4-dimethylamino-1-phenyl-2,3-dimethyl-5-pyrazolone which comprises the steps of heating the melt, which is obtained by the action of p-toluene-sulphonic-acid-methyl-ester on 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, crystallizing out the sulphonate of 1-phenyl-2,3-dimethyl-5-pyrazolone which is formed, removing said sulphonate by filtration, washing said sulphonate with a dilute mineral acid, adding to said sulphonate an alkali-metal nitrate whereupon 4-nitroso-1-phenyl-2,3-dimethyl-5-pyrazolone is formed, washing said 4-nitroso compound with alcohol, adding to said washed compound sodium bisulphate, ice and zinc dust, whereupon a chemical reaction occurs, which reaction at first proceeds at a relatively low temperature, which temperature is raised automatically by the heat of the reaction until a temperature of substantially 30° C. is obtained, thereby producing a slurry containing zinc sulphite and a solution containing 4 - amino - 1 - phenyl-2,3-dimethyl-5-pyrazolone, removing said slurry by filtration, heating said resulting filtrate with formaldehyde and formic acid whereby the desired product is produced, and then isolating said desired product.

16. A process for producing 4-dimethylamino-1-phenyl-2,3-dimethyl-5-pyrazolone which comprises the steps of heating a melt, obtained by the methylation of 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, crystallizing out the salt of 1-phenyl-2,3-dimethyl-5-pyrazolone which is formed, removing said salt by filtration, washing said salt with a dilute mineral acid, adding to said salt an alkali-metal nitrate, thereby forming 4-nitroso-1-phenyl-2,3-dimethyl-5-pyrazolone, washing said 4-nitroso compound with alcohol, adding to said washed compound sodium bisulphite, ice and zinc dust whereupon a chemical reaction occurs which reaction at first proceeds at a relatively low temperature, which temperature is raised automatically by the heat of the reaction until a temperature of 30° C. results, whereupon a slurry of zinc sulphite and a clear solution of 4-amino-1-phenyl-2,3-dimethyl-5-pyrazolone is produced, filtering to remove said slurry, heating said resulting filtrate with formaldehyde and formic acid, whereupon the desired product is produced, distilling off part of the liquid in which said product is dissolved, thereby concentrating the solution, adding to said concentrated solution an alkali metal compound which is basic in reaction until the solution is alkaline in reaction, and then isolating the desired product.

17. A process for producing 4-dimethylamino-1-phenyl-2,3-dimethyl-5-pyrazolone which comprises the steps of heating a melt, resulting from the methylation of 1-phenyl-3-methyl-5-pyrazolone, with a compound of the group consisting of an alkali-metal hydroxide, an alkali-metal carbonate, and an alkali-metal bicarbonate at a temperature of substantially 100° C. for a relatively long period of time, acidulating the resulting mass with a dilute solution of a mineral acid, crystallizing out the product resulting, which is a salt of 1-phenyl-2,3-dimethyl-5-pyrazolone, filtering off said salt, washing said salt with dilute mineral acids, adding to said salt an alkali-metal nitrate, thereupon producing 4-nitroso-1-phenyl-2,3-dimethyl-5-pyrazolone, washing said 4-nitroso compound with alcohol, adding to said washed compound sodium bisulphite, ice and zinc dust whereupon a chemical reaction occurs, which reaction at first proceeds at a relatively low temperature, which temperature is automatically raised by the heat of the reaction until a temperature of substantially 30° C. is obtained, thereby producing a slurry containing zinc sulphite and a solution containing 4-amino-1-phenyl-2,3-dimethyl-5-pyrazolone, filtering to remove said slurry, heating the resulting filtrate with formaldehyde and formic acid, thereupon forming the desired product, distilling off part of the liquid in order to concentrate the solution of said product, adding to said concentrated solution an alkali compound which is basic in reaction until such solution is alkaline in reaction, removing the desired product, redissolving said product in benzene, and evaporating off the benzene in a vacuum in order to isolate said product.

18. A process for producing 4-dimethylamino-1-phenyl-2,3-dimethyl-5-pyrazolone which comprises the steps of heating the melt, resulting from the treatment of 1-phenyl-3-methyl-5-pyrazolone with a methylating agent, with a compound of the group consisting of an alkali-metal hydroxide, an alkali-metal carbonate, and an alkali-metal bicarbonate at a temperature of substantially 100° C. for a relatively long period of time, acidulating said resulting mass with a dilute solution of a mineral acid, crystallizing out the salt of 1-phenyl-2,3-dimethyl-5-pyrazolone which is formed, filtering to remove said salt, washing said salt with a dilute mineral acid, adding to said salt an alkali-metal nitrite thereupon forming 4-nitroso-1-phenyl-2,3-dimethyl-5-pyrazolone, washing said 4-nitroso compound with alcohol, adding to said washed compound sodium bisulphite, ice and zinc dust, whereupon a chemical reaction occurs which reaction first proceeds at a relatively low temperature, which temperature is automatically raised by the heat of the reaction until a temperature of substantially 30° C. is obtained, thereby producing a slurry containing zinc sulphite and a solution of 4 - amino-1-phenyl- 2,3 -dimethyl- 5 -pyrazolone, filtering to remove said zinc sulphite, heating said filtrate with formaldehyde and formic acid, thereupon producing the desired product, adding an alkali thereto in order to render the solution alkaline in reaction, extracting said solution with benzene, and isolating the desired product by evaporating off the benzene, which evaporation is carried out in two stages, at the commencement of the evaporation process at normal pressure conditions and subsequently in said evaporation process, in a partial vacuum.

19. A process for producing 4-dimethylamino-1-phenyl-2,3-dimethyl-5-pyrazolone which comprises the steps of reacting 1-phenyl-3-methyl-5-pyrazolone with p-toluene-sulphonic-acid-methyl-ester in the absence of a solvent at an elevated temperature, thereby producing a melt, dissolving said melt in warm water, acidulating the resulting solution with a dilute solution of a mineral acid, crystallizing out a portion of the formed p-toluene-sulphonic-acid-salt of the 1-phenyl-2,3-dimethyl-5-pyrazolone by crystallization, filtering off said crystallized salt, concentrating the resulting filtrate, heating it with an excess amount of a compound of the group consisting of an alkali-metal hydroxide, an alkali-metal carbonate, and an alkali-metal bicarbonate at substantially 100° C. for a relatively long period of time, acidulating the resulting solution with a dilute solution of a mineral acid, crystallizing out the second portion of the p-toluene-sulphonic acid salt of 1-phenyl-2,3-dimethyl-5-pyrazolone, combining the two crystallized portions, washing said salt with a dilute mineral acid, adding to said salt an alkali-metal nitrite, thereupon producing 4-nitroso-1-phenyl-2,3-dimethyl-5-pyrazolone, washing said 4-nitroso compound with alcohol, adding to said washed compound sodium bisulphite, ice and zinc dust, whereupon a chemical reaction occurs, which reaction at first proceeds at a relatively low temperature, which temperature is automatically raised by the heat of the reaction until a temperature of substantially 30° C. results, whereby a slurry of zinc sulphite and a solution of 4-amino-1-phenyl-2,3-dimethyl-5-pyrazolone results, filtering to remove said slurry, treating the resulting filtrate with formaldehyde and formic acid in order to form the desired product and isolating the desired product.

20. A process for producing 4-dimethylamino-1-phenyl-2,3-dimethyl-5-pyrazolone which comprises the steps of reacting 1-phenyl-3-methyl-5-pyrazolone with p-toluene-sulphonic acid methyl ester in the absence of a solvent at an elevated temperature, thereby producing a melt, dissolving said melt in warm water, acidulating the resulting solution with a dilute solution of a mineral acid, crystallizing out a first portion of the formed p-toluene-sulphonic acid salt of 1-phenyl-2,3-dimethyl-5-pyrazolone, filtering off said crystallized salt, concentrating the resulting filtrate, heating said filtrate with an excess amount of a compound of the group consisting of an alkali-metal hydroxide, an alkali-metal carbonate, and an alkali-metal bicarbonate at substantially 100° C. for a relatively long period of time, acidulating the resulting mass with a dilute solution of a mineral acid, crystallizing out a second portion of the p-toluene-sulphonic acid salt of 1-phenyl-2,3-dimethyl-5-pyrazolone, combining said two portions of the salt, washing said salt with a dilute mineral acid, adding to said salt an alkali-metal nitrite thereby producing 4-nitroso-1-phenyl-2,3-dimethyl-5-pyrazolone, washing said 4-nitroso compound with alcohol, adding to said washed compound sodium bisulphite, ice and zinc dust, whereupon a chemical reaction occurs which reaction at first proceeds at a relatively low temperature, which temperature is automatically raised by the heat of the reaction until a temperature of substantially 30° C. results, thereby producing a slurry of zinc sulphite and a solution of 4-amino-1-phenyl-2,3-dimethyl-5-pyrazolone, filtering to remove said slurry, heating the resulting filtrate with formaldehyde and formic acid, whereupon the desired product is produced, adding an alkali to said resulting solution until said solution is alkaline in reaction, extracting said resulting solution with benzene, and evaporating off the benzene to recover the desired salt by distillation, carried out at first under normal pressure conditions, and, later on during the process of distillation, under a partial vacuum.

BAPTIST REUTER.